(12) United States Patent
Zhang

(10) Patent No.: US 9,392,570 B1
(45) Date of Patent: Jul. 12, 2016

(54) METHOD OF USING AIRCRAFT FOR PROVIDING MOBILE NETWORK CONNECTION AND LOCATING SUBSCRIBERS IN SPECIFIED AREAS

(71) Applicant: ZEPHYR TECHNOLOGY CO., LIMITED, Hong Kong (HK)

(72) Inventor: Quan An Zhang, Hong Kong (HK)

(73) Assignee: GARINI TECHNOLOGIES CORPORATION PTE. LTD., Singapore (SG)

( * ) Notice: Subject to any disclaimer, the term of this patent is extended or adjusted under 35 U.S.C. 154(b) by 36 days.

(21) Appl. No.: 14/560,127

(22) Filed: Dec. 4, 2014

Related U.S. Application Data

(60) Provisional application No. 61/911,822, filed on Dec. 4, 2013.

(51) Int. Cl.
*H04K 3/00* (2006.01)
*H04W 64/00* (2009.01)
*G06Q 50/26* (2012.01)

(52) U.S. Cl.
CPC ............... *H04W 64/00* (2013.01); *G06Q 50/26* (2013.01); *H04K 3/65* (2013.01)

(58) Field of Classification Search
CPC ............. H04B 7/18506; H04W 4/025; H04W 52/0254; H04W 64/00
USPC ............ 455/1, 431, 456.1–457, 404.1, 404.2, 455/403, 422.1, 426.1, 426.2, 561, 500, 455/517, 507, 508, 521; 340/539.1, 937, 340/539.13; 370/310, 316
See application file for complete search history.

(56) References Cited

U.S. PATENT DOCUMENTS

| | | | | |
|---|---|---|---|---|
| 8,249,586 | B2 * | 8/2012 | Bosenbecker | H04W 60/04 455/11.1 |
| 8,887,208 | B1 * | 11/2014 | Merrit | 370/316 |
| 2007/0042772 | A1 * | 2/2007 | Salkini | G01S 5/02 455/431 |

* cited by examiner

*Primary Examiner* — Keith Ferguson
(74) *Attorney, Agent, or Firm* — Bardmesser Law Group

(57) ABSTRACT

A system for tracking mobile subscribers, the system includes an aircraft having an on-board virtual BTS that substitutes for a stationary BTS. The virtual BTS emulates a behavior of the stationary BTS so as to be indistinguishable from the stationary BTS to the mobile device, including emulation of communication protocols and billing operations The virtual BTS communicate with the mobile devices. The virtual BTS includes a processor running Software Defined Radio (SDR) and a signal amplifier, the SDR receiving identifiers of the mobile devices. The aircraft includes a high-gain antenna for determining directions of signals from the mobile devices. A camera on board the aircraft takes images or video of an area on the ground. The processor collects and processes the images or video, the directions of the signals and the identifiers of the mobile devices to locate a specific subscriber. The processor transmits the processed information to a server.

13 Claims, 6 Drawing Sheets

METHOD OF USING AIRCRAFT FOR PROVIDING MOBILE NETWORK CONNECTION AND LOCATING SUBSCRIBERS IN SPECIFIED AREAS

CROSS-REFERENCE TO RELATED APPLICATIONS

This application claims priority to U.S. Provisional Patent Application No. 61/911,822, filed on Dec. 4, 2013, incorporated herein by reference in its entirety.

FIELD OF THE INVENTION

The present invention relates to mobile networks and, in particular, to means and methods of providing mobile connection in specified areas, as well as collecting statistics and identifying data of mobile network subscribers located in the area.

DESCRIPTION OF THE RELATED ART

The present invention relates mainly to mobile communication technologies. The existing mobile networks (2G/3G/4G) are also known as "cellular networks" because of their structure. A network comprises several functional entities with functions and interfaces that can be specified individually. For example, a GSM-network consists of 3 main parts: a Mobile Station, a Base Station Subsystem, which maintains a radio frequency connection with the Mobile Station, and a Network Subsystem. The core of the Network Subsystem is the Mobile Services Switching Center, or the Switching Center, which not only switches subscribers' communication channels, but also controls mobile services. An Operations and Maintenance Center verifies validity of network operations and prepares new networks for operations. The subsystems of the Mobile Station and Base Station are connected via a UM-interface, which is also known as "air interface" or "radio link". The Base Station Subsystem is connected to the Switching Center via an A-interface. Base stations and their controllers primarily use wired connections, but can also be connected by means of wireless interfaces or satellites.

Each base station has its "capacity", which is the maximum number of subscribers that can be connected to a station. Consequently, the capacity of an area is the total capacity of all base stations situated in that area. In order to expand capacity of the network, additional base stations have to be built, or existing equipment has to be replaced or upgraded to provide extra radio channels. However, this method has its drawbacks from financial point of view: peak traffic in an area can exceed the maximum capacity of the base stations area, e.g., during some event, but after the event is over, such traffic will not be achieved again for a long time, thus leaving expanded capacity unused. For such situations, major mobile communications providers employ mobile base stations—usually trucks with a mast antenna for a BTS (base transmitting station). It receives subscribers' signals, converts them (to satellite signals, for instance) and then transmits them to the provider's network (e.g., to a base station controller).

Such a conventional approach can be used to expand capacity in the specified area quickly and cheaply, but in order to work well, several limitations exist on the conventional approach, such as: the area must be passable for base-station-carrying vehicles, there should be alternative data transmitting channels to external networks, to the provider's network, and so on The invention described below allows to avoid some of the limitations posed by geographical conditions of an area and availability of alternative means of communication.

SUMMARY OF THE INVENTION

The invention consists of two independent parts: an aircraft and a connection spot, which can function in different modes according to the tasks and objectives it is used for, as well as a videocamera and directional antenna(s).

An unpiloted aircraft (UAV) may be used, such as: a helicopter, a balloon, a blimp, a dirigible balloon, an air drone (including quadracopter-type aircraft with any number of engines), an unmanned aircraft, a GPS-controlled aircraft, a plane, etc. The invention places no particular limits on the aircraft's aerodynamic parameters, its power and traction, or type of fuel it uses. The aircraft can be controlled via the same link (channel) as the connection spot, or it can have a separate control link. For example, the aircraft can be controlled via one of the wireless channels (and video can be downloaded from the aircraft using a wireless channels), or separate channels can be used.

A connection spot can be a base station (virtual BTS) conforming to one or more connection standards (2G/3G/4G), or a software-defined radio. The range of functions it can perform depends on the working mode. The available modes are:

subscriber identification mode (in a specified area)
    subscriber search mode (in a specified area)
    subscriber connection mode (to their provider's network)
    isolated network mode
    These modes have the following uses:
    Subscriber identification mode can be used for security breach checks in large areas, such as mountains, deserts, industrial zones, squares. In this mode, the connection spot collects identifying data of neighboring mobile stations and terminals (IMSIs and/or IMEIs) extracting them from the GSM/3G/LTE traffic, since during authorization, IMSI is transmitted, and IMEI can be transmitted as well, therefore, passive monitoring of the radio channel can provide this information. Optionally, the system can cut off subscribers, which are on the black list or not on the white list, from network. The data thus collected can be promptly transmitted to a remote server or control device, and also be stored in local memory. A directional antenna can be used, with the gain profile corresponding to the field of view of the video camera, which permits matching the images from the camera with identifiers of the mobile devices collected by the BTS.
    Subscriber search mode can be used during law enforcement searches or rescue operations. The system can be used either in sparsely populated areas (forests/deserts/mountains) or, with some convenience and efficiency issues, in densely populated areas (cities/living or working districts/transport hubs/etc.). In this mode, the system can look for specific subscribers, or for all available subscribers. An available subscriber, in this case, should be connected to a mobile terminal or station operating using one of connection standards provided by the connection spot. When a (specific) subscriber is found, the system tries to connect to their mobile device, thus enabling to find them by a sound signal. Also, the connection device can be used to transmit urgent messages. Another method of looking for mobile devices is possible due to the mobility of the BTS by measuring the strength of the signal received from the phone from various locations and with various antenna orientations. This permits more precise determination of location of the mobile device, without the mobile device user being aware of it.

Subscriber connection mode allows to employ the connection spot as a mobile BTS—a part of the network infrastructure. This mode is convenient for providing connection in areas, that are difficult to access or possess landscape features (mountains, ravines, crevices), which requires a BTS to be positioned fairly high to provide good coverage. In this mode, the connection spot can imitate a BTS, or BTS+BSC as well—which will determine the node in the network structure to be used for connection to the provider.

Isolated network mode allows to deploy an independent network in the specified area, in addition to or in parallel with existing providers and their zones of coverage. The system can operate using any available standard; it allows to link mobile devices and mobile terminals connected to the connection spot. Such a connection bypasses providers' billing systems and is thus free of charge for subscribers (an independent billing system can also be set up). External connections can be made via VoIP services and SMS-gateways. The system can be used as an alternative to a walkie-talkie network for a group of people as it doesn't require any special equipment.

Below is the description of preferred embodiments of the invention to implement its functions. A software-defined radio (SDR) can be used to imitate either a single node of the existing network or a substantial part of the entire network structure by means of software modules. Software-defined radio (SDR) is a radio communication system where components that have been typically implemented in hardware (e.g. mixers, filters, amplifiers, modulators/demodulators, detectors, etc.) are instead implemented by means of software on a personal computer or embedded system. The system is connected to the mobile station via a mobile communications standard (GSM/CDMA/LTE) through a Um-interface (i.e., the interface between the mobile device and the base station) and supports all the functions of these protocols. All data sent and received may be stored either locally and remotely, and be transmitted to a control device as well.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
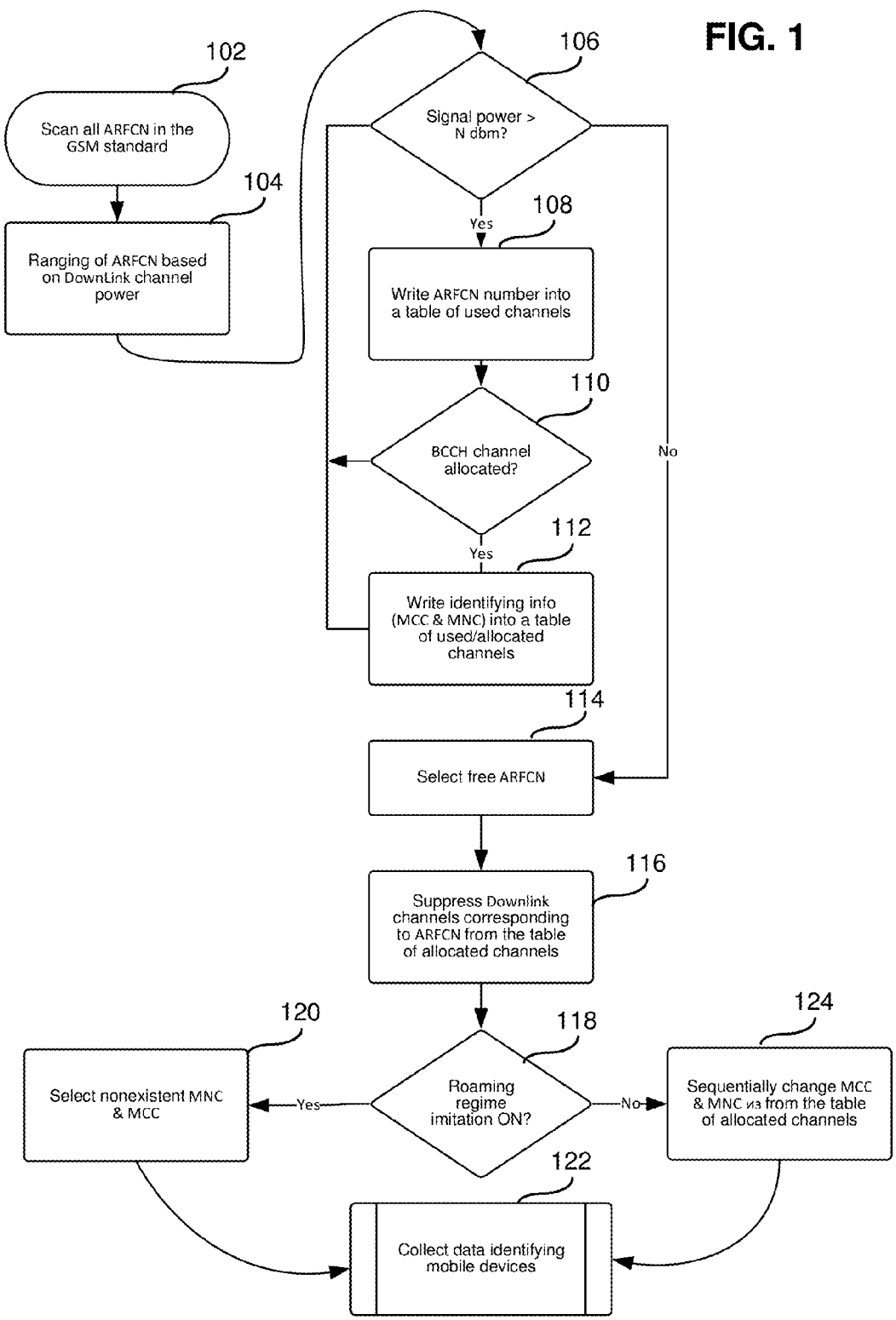
FIG. 1 illustrates an algorithm for identifying subscriber channels and intelligent channel jamming, in accordance with the exemplary embodiment.

Reference will now be made in detail to the preferred embodiments of the present invention, examples of which are illustrated in the accompanying drawings.

While the use of drone aircraft has been increasing in recent years, these drones are primarily concerned with providing of photo, video and geolocation data, depending on the purpose of the flight. Such systems, however, do not provide an ability to track and focus on a specific person, except possibly through the use of image recognition techniques, which are not always reliable and not always practical. The present invention provides for an ability to identify individuals that are within camera view (and within a directional sensitivity of an antenna) based on unique identifiers of mobile phones used by the people in question.

Although the use of airborne Wi-Fi access points is known, such an approach is only marginally successful for identifying individuals, because:

Not all mobile phones have their Wi-Fi chip turned on

Not all phones permit identification using the MAC address, and some phones randomize the MAC address when searching for a network.

When using GSM/3G/4G type networks, a number of things have to be done to successfully identify users of the phones. For example, the frequency needs to be dynamically changed, to avoid mutual jamming of the frequency by a BTS that is nearby.

A subscriber is identified using a following procedure:

a) when a subscriber enters the area covered by a directive gain antenna, they are re-connected to a connection device located on the aircraft;

b) a camera located on the aircraft takes picture or video footage of the subscriber (or a group of people containing the subscriber);

c) a mobile device sends its identifying data (IMSI and IMEI) to the connection device;

d) these identifying data is used to find the subscriber in the mobile communications provider's database;

e) full data are then sent to the provider and stored in local memory.

A system of intelligent connection jamming is used to cut off the subscriber from the provider's network. In order to explain how it works, the structure of a physical (e.g. GSM) channel should be described. Each base station has at least 2 physical channels: an UpLink channel to receive signals from mobile stations and a DownLink channel to send signals to mobile stations. The bandwidth of each channel is 0.2 MHz. Each pair of channels is linked to a certain channel number, or ARFCN. In order to jam connections in a specified area, the whole frequency range corresponding to the GSM-standard is usually jammed. If such an approach is used, it is difficult to re-connect a mobile phone to a connection spot, because in that case the spot should have high capacity. The access point needs to transmit at a relatively high power, at a minimum, higher than the noise level. The present invention uses intelligent jamming, which jams only a busy ARFCN, thus enabling to create a connection spot from any free ARFCN without any significant capacity requirements. Thus, only those channels ARFCN channels are jammed that are used by the mobile network operator, while the subscribers using those channels experience a dropped connection.

Another method for making the mobile devices switch to the airborne mobile BTS is by emulation of the base station of an operator with better priority parameters (e.g., C1 and C2 in the GSM standard, similar parameters in other standards). The use of a movable (airborne) base station gives that advantage that it is possible to assess the radio environment prior to launch and operation of the airborne BTS. With accumulation of a large amount of data regarding which channels are in use, it is possible to select the best channel and transmit the best parameters, compared to a stationary BTS. Thus, subscribers will be more likely to switch to airborne BTS.

The system also employs directed gain antennas, which focus the entire power of the transmitter in a narrow angular range, in order for intelligent jamming to work even in the vicinity of real base stations. Also, such an antenna provides for rather precise location of subscribers and taking pictures or video footage of them.

After the connection spot occupies a free physical ARFCN-channel, it starts to imitate a logical BCCH (broadcast) channel, which is used to transmit identifying data of a base station. Operator identification data (MCC, MNC, LAC, CELLID) is translated, and priority coefficients of the base station that are responsible for the phone selecting the base station (C1 and C2) are increased, even if another, more powerful base station is available. In general, it is only required that a base station with the given identifying data (country and provider number codes) is not prohibited. In some cases, it could be necessary that the connection device in the aircraft imitate a base station of a local provider. The present invention provides two solutions for that problem: a) there are identifying data of non-existent network and country, which are transmitted via the logical BCCH-channel, so that the mobile station, being unable to perceive any real base stations, considers itself to be in roaming and tries to connect to the connection spot; b) the identifying data correspond to a real local provider, but are changed, thus forcing the mobile station to re-connect. Providing that geographical conditions are good, the system returns an IMSI—a unique SIM-card ID (which can also yield additional data about its owner, as it is necessary to present personal data when buying a SIM-card in some countries), an IMEI—a unique mobile device ID (which can help to track the history of owners and SIM-cards), and a picture of a subscriber. This data can be sufficient to fully identify a subscriber. Also, video footage (e.g., from a camera mounted on the aircraft) could be downloaded to the base station or to a server and used to register illegal activities.

When it is necessary to find a subscriber and/or his mobile device, the following is performed:

1. An approximate location is determined using the video camera and the directional antenna. This permits only a rough estimate of the location, however, an important aspect is that it can be done fairly rapidly. With the airborne BTS having an antenna whose gain profile matches the field of view of the camera, when new data is received by the antenna regarding identification of the mobile device, an image or video is taken by the video camera, and the image/video is tied to the identification data received by the antenna. Using a high gain antenna (e.g., with a high gain in a 10 degree field of view) permits increasing the accuracy of the determination, as long as the subscriber is not too far, e.g., within a mile or two.

2. An RRLP request is sent. Radio resource location services protocol (RRLP) applies to GSM and UMTS Cellular Networks. It is used to exchange messages between a handset and an SMLC in order to provide geolocation information; e.g., in the case of emergency calls. The protocol was developed in order to fulfil the Wireless Enhanced 911 requirements in the United States. However, since the protocol does not use require any authentication, and it can be used outside a voice call or SMS transfer, its use is not restricted to emergency calls and can be used by law enforcement to pinpoint the exact geolocation of the target's mobile phone. The use of this protocol permits receiving GPS/GLONASS coordinates of the mobile device remotely, although only if the GPS signal is available to be received.

3. Using a voice call, with a subsequent search using an audio signal, people trapped under fallen buildings and landslides can be found, particularly when the subscriber is unable to manually respond.

4. Triangulation can also be used, when the airborne BTS establishes a hidden connection, i.e., the mobile device does not show the call, but the GSM chip in the phone still is used to identify the coordinates and transmit them to the BTS. The aircraft, using the antenna and measurements of the signal taken from different locations can triangulate on the location of the subscriber. Then, depending on weather conditions and other factors, a photo or video of the location can be taken, to match the coordinates determined by triangulation. Multiple aircraft BTSs can be used, to accelerate the process. The server aggregates and processes the information, including the video/image data, the antenna direction data, the identification data, the aircraft location data, the received signal power data, and so on.

As shown in FIG. 1, the following steps are performed:

1. Scanning of all ARFCNs in the given GSM standard is performed in step 102.

2. Ranking of ARFCNs according to the capacity of their DownLink channel is performed in step 104.

3. Is the signal power higher than N dbm? (step 106.)

4. The ARFCN channel is listed as busy (step 108.)

5. Was the BCCH channel successfully found? (step 110.)

6. Recording the identifying data (MCC and MNC), which have been extracted from the channel (step 112.)

7. Looking for a free ARFCN channel (step 114.)

8. Switching on intelligent jamming of all channels listed as busy (step 116.)

9. Is the roaming imitation mode on? (step 118.)

10. (yes) Choosing non-existent MNC and MCC (step 120.)

11. (no) Varying MNCs (Mobile Network Code) and MCCs (Mobile Country Code) listed as busy (step 124.)

12. Collecting identifying data of a mobile device (step 122.)

Figure 4:
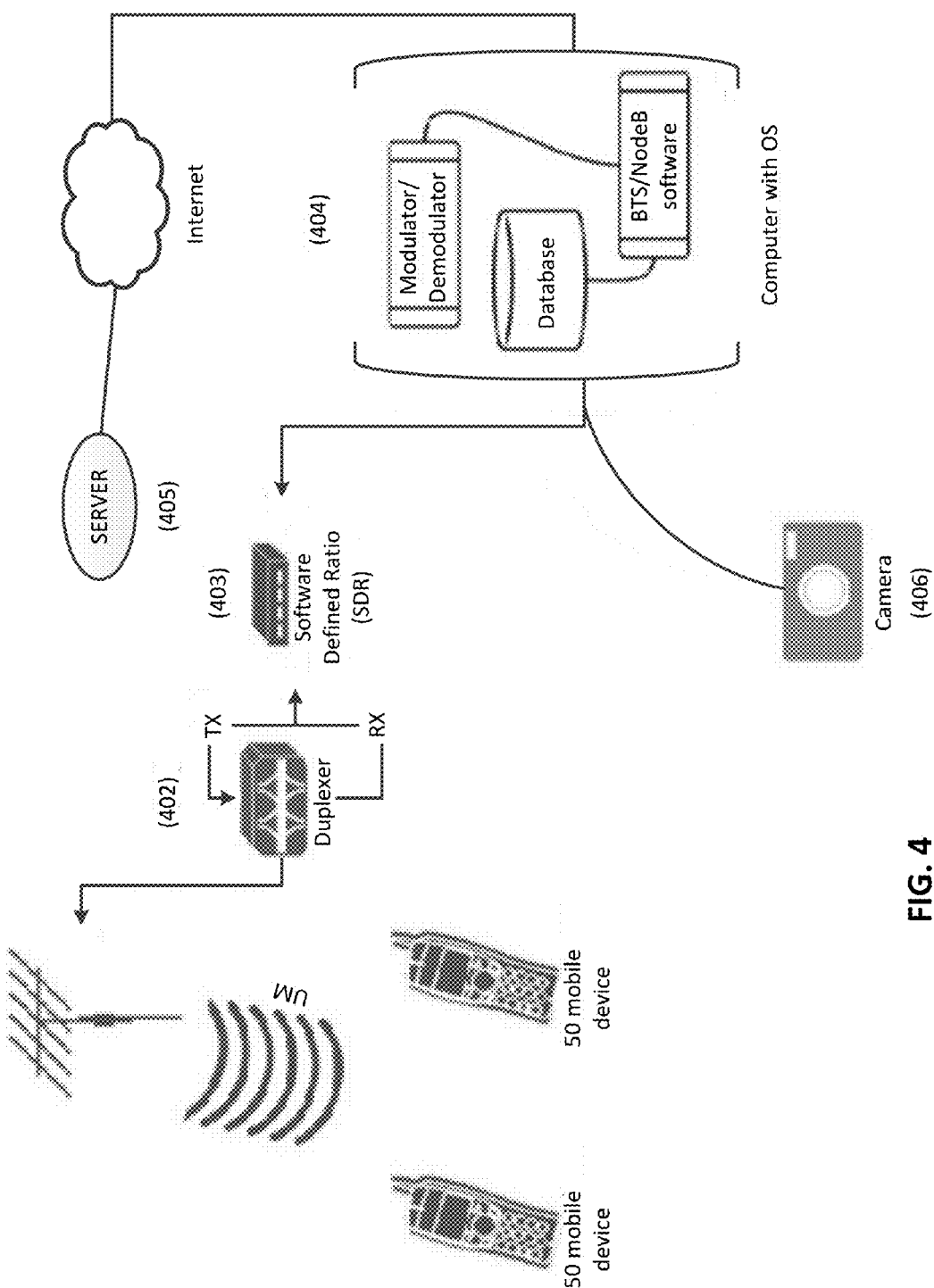
FIG. 4 illustrates an exemplary system utilizing the ideas described herein.

FIG. 4 illustrates an exemplary system utilizing the ideas described herein. The subscriber terminals 59 can connect to the mobile network (stationary or mobile BTS). The BTS has to support the relevant standards expected by the mobile devices 59.

A duplexer 402 is used to mix the receiving and transmitting channel. The use of the duplexer improves the quality of the received signal and permits using the same antenna for both sending and receiving.

Software Defined Radio (SDR) 403 is a technology that permits using software to dynamically change the frequencies, modulation, power and other parameters of the radio signal. The processing of the signal is done on the computer 404. The use of the SDR platform also permits easy determination of the signal powers at various frequencies.

The computer 404 processes the signals and emulates the behavior of a BTS. The computer 404 also stores a database of subscribers. The software on the computer 404 defines the standards used by the BTS to communicate with the subscribers. The computer 440 also runs algorithms for determining the location of the subscriber using triangulation, and receives the images/video from the camera 406.

The external server 405 receives the data, such as coordinates of the aircraft, its orientation in 3-D space, identification data of the subscribers, activity on the radio channels, photo and/or video files from the aircraft and any other cameras. By comparing the data (optionally, from multiple aircraft), the server can determine the location of the subscribers based on their signal strength and other data. All the aircraft have their clocks synchronized. The server can produce reports, generate statistics and analyze the images to match them to mobile device identifiers. The server can also connect remotely to the airborne BTSs to configure them.

The camera 406 with zoom is used to capture images that match an antenna's gain profile.

Figure 5:
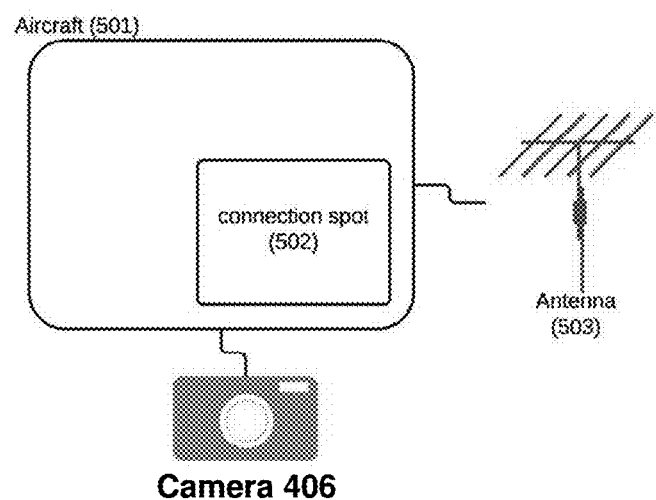
FIG. 5 illustrates another aspect of the exemplary system utilizing the ideas described herein.

FIG. 5 illustrates another aspect of the exemplary system utilizing the ideas described herein. In FIG. 5, 501 is the aircraft, such as a helicopter, a blimp, a drone, a quadracopter, etc. The aircraft needs sufficient lifting power to carry an airborne BTS, the antenna(s) and the camera 506. The aircraft is controlled remotely, either using the same channels as those utilized by the BTS, or a separate dedicated channel. In some cases, using a spooled wire to control the aircraft may be possible, to increase on-station time.

502 is the BTS, further described above. 503 is the antenna, with various gain profiles, which permits efficiently locating the subscribers. Both highly directive and diffuse gain profiles can be used (highly directive for location, diffuse for mobile connections).

406 is the camera with zoom, as described above.

The aircraft may have one or more of the subsystems discussed below, which permit improving some of the parameters of the aircraft.

1. A protective airbag in case of a crash of the unmanned aerial vehicle. The airbag may be inflated either using pyrobolts or using the on-board engine or turbine of the UAV itself. This is more effective than a parachute, since the size and weight of such an airbag are much less, and is generally safer for the public. The airbag(s) is mounted on the surface of the UAV, generally on the bottom-facing surface. Anywhere from 1 to 2-8 such airbags may be used.

The airbag activation system can have a power supply that is separate from the rest of the UAV, and can deploy either automatically or manually. For example, it can deploy during severe vibration or acceleration overloads, critical control system errors, when a fall is detected, or upon manual instruction from the pilot.

2. A heating system for electronics can be installed on the UAV, depending on weather conditions and geographic region where the UAV is used. Sensors for the temperature conditions are also mounted inside the UAV, in proximity to the on-board electronics, in order to know when to activate the heating system. The on-board electronics is generally housed in a thermally protected compartment of the UAV, and circuit boards can be covered with a water-resistant coating, such as silica gel.

The battery compartment is also protected from water and moisture damage, and can have its own heating elements. The power wiring uses low-resistance high-cross-section conductors. When the UAV is started, the first thing to activate is usually the heating system (at a minimum, to check if heating is needed). Then, once proper temperature is reached, the on-board electronics can start, and the engine can being operation. The heating system is responsible for maintaining proper temperature of the batteries and the electronics throughout the flight.

3. The BTS uses an antenna with a highly directional profile of its directional diagram, generally with the peak of the gain being in the downward direction. As a further option, the antenna can be mounted on a suspension with one or two degrees of rotational freedom, and rotated using a motor, in order to better determine the direction towards the transmitter (subscriber's mobile device), and/or to optimize the orientation of the antenna so as to avoid interfering with the radio commands to the UAV. The motor is controlled using the on-board electronics+

4. The antenna(s) are mounted so as to improve electromagnetic compatibility characteristics. In the case of separate antennas that receive and transmit, these antennas should be as far as possible from each other. Satellite receiving antennas, if any, should preferably be located on separate mounting brackets. Ground shielding can be used between the antenna (s) and the rest of the electronics.

5. As another option, the antennas may be placed in plasma volumes, where the plasma is excited so as to permit transmission of the relevant frequencies and filtering of other frequencies, including filtering of electromagnetic effects of the various components of the UAV on each other.

6. The on-board electronics provides for both remotely piloted mode and for autonomous mode using pre-programmed flight patterns, based on GPS signals or inertial navigation systems or both. The on-board processor can generate its own flight pattern based on specific task parameters and the UAV/BTS/antenna characteristics and the expected area that needs to be covered.

Figure 2:
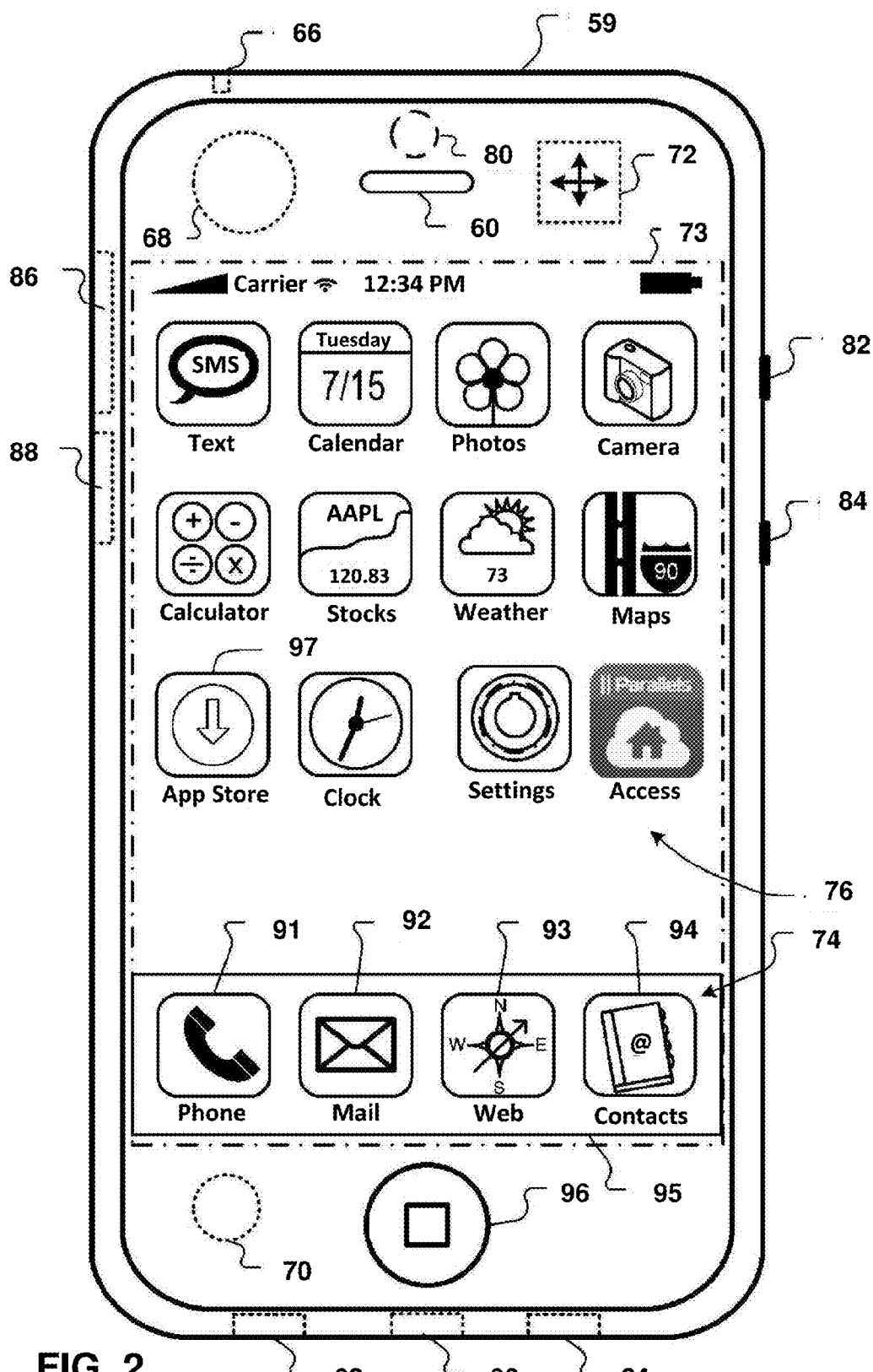
FIG. 2 is a block diagram of an exemplary mobile device that can be used in the invention.

FIG. 2 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 3:
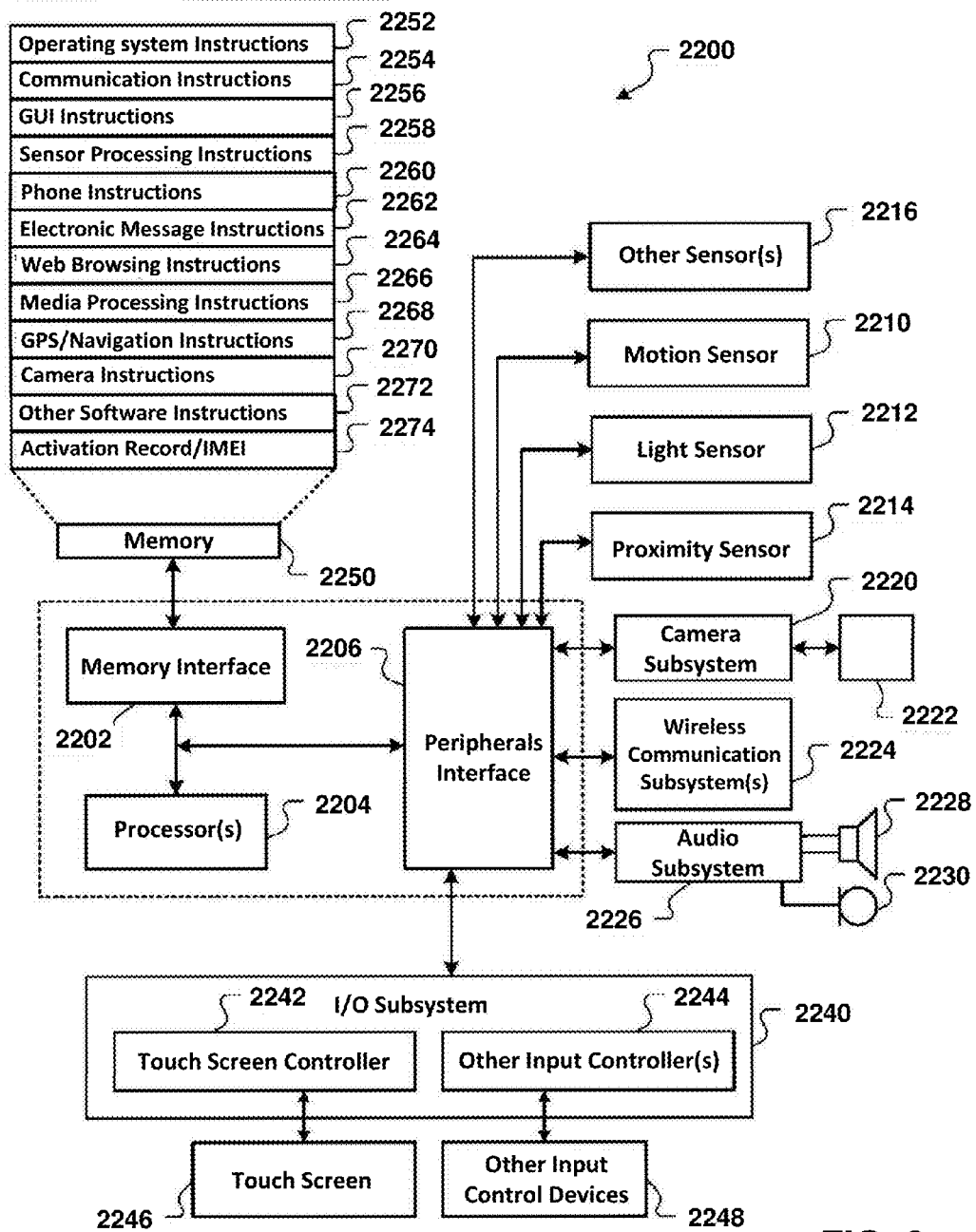
FIG. 3 is a block diagram of an exemplary implementation of the mobile device.

FIG. 3 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Figure 6:
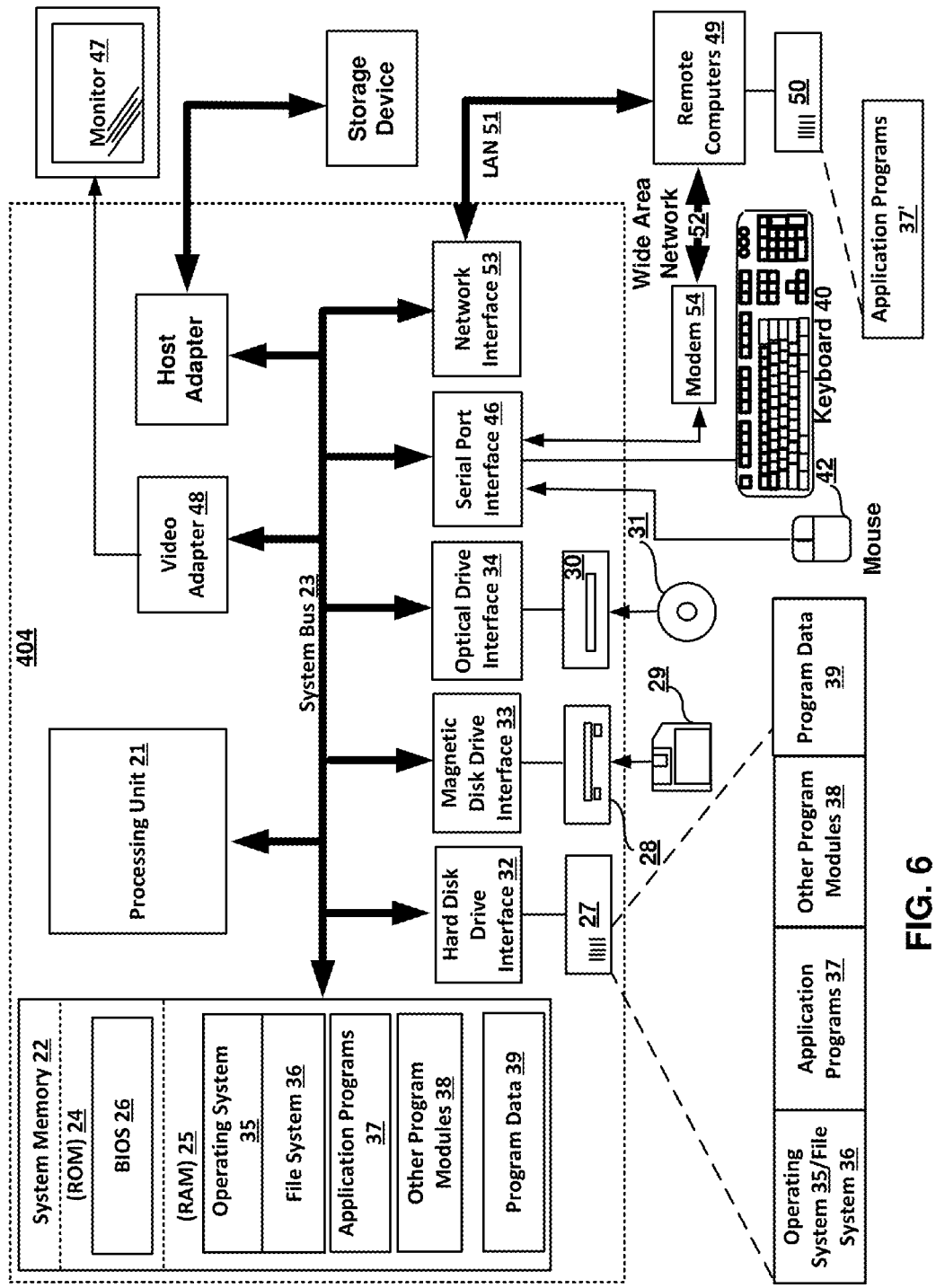
FIG. 6 illustrates an exemplary computer system that may be used in the present invention.

With reference to FIG. 6, an exemplary system for implementing the invention includes a general purpose computing device in the form of a personal computer or server 404 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 404, such as during start-up, is stored in ROM 24.

The personal computer 404 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide a non-volatile storage of computer readable instructions, data structures, program modules/subroutines, such that may be used to implement the steps of the method described herein, and other data for the personal computer 404.

Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 404 includes a file system 36 associated with or included within the operating system 35, such as the Windows NT™ File System (NTFS), one or more application programs 37, other program modules 38 and program data 39. A user may enter commands and information into the personal computer 404 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 404 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 404, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 404 is connected to the local network 51 through a network interface or adapter 53. When used in a WAN networking environment, the personal computer 404 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 404, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A system for tracking mobile subscribers, the system comprising:
   (a) an aircraft having an on-board virtual Base Transmitter Station (BTS) that substitutes for a stationary BTS to which mobile devices normally connect, wherein the virtual BTS emulates a behavior of the stationary BTS so as to be indistinguishable from the stationary BTS to the mobile device, including emulation of communication protocols and billing operations;
   (b) the virtual BTS configured to communicate with the mobile devices;
   (c) the virtual BTS including a processor running Software Defined Radio (SDR) and a signal amplifier, the SDR receiving identifiers of the mobile devices;
   (d) the aircraft also including a high-gain antenna for determining directions of signals from the mobile devices;
   (e) a camera on board the aircraft for taking images or video of an area on the ground;
   (f) the processor collecting and processing the images or video, the directions of the signals and the identifiers of the mobile devices to locate a specific subscriber; and
   (g) the processor transmitting the processed information to a server.

2. The system of claim 1, wherein the aircraft is an unmanned aerial vehicle controlled remotely through the same radio channels as those used by the virtual BTS.

3. The system of claim 1, wherein the virtual BTS collects IMEI and/or IMSI data of the subscribers, and wherein the virtual BTS jams particular channels using a white list.

4. The system of claim 1, wherein the virtual BTS collects IMEI and/or IMSI data of the subscribers, and wherein the virtual BTS jams particular channels using a black list.

5. The system of claim 1, wherein the virtual BTS is integrated with existing mobile network operator and supports SMS and packet traffic using any of the following protocols: SS7, A, A-bis.

6. The system of claim 1, wherein the virtual BTS enables a search based on an open audio channel and using acoustic signatures of the mobile devices, based on a change of position of the aircraft relative to the mobile devices.

7. The system of claim 6, wherein the virtual BTS enables the search by opening the audio channel with the mobile device.

8. The system of claim 6, wherein the virtual BTS enables the search based on a signal strength of the connection with the mobile device as measured from multiple locations, and based on coordinates of the virtual BTS.

9. The system of claim 1, wherein the virtual BTS also uses delays or RRLP requests and responses to determine subscriber location.

10. The system of claim 1, wherein the high gain antenna has an approximately 10 degree field of view.

11. The system of claim 1, wherein the high gain antenna has a field of view that matches a field of view of the camera.

12. The system of claim 1, wherein the high gain antenna has a peak gain directed in a downward direction.

13. The system of claim 1, wherein the virtual BTS emulates all mobile operator infrastructure, including BTS, BSC, MSC and HLR.

* * * * *